Feb. 15, 1944.  C. S. ASH  2,341,755
DUAL WHEEL ASSEMBLY
Filed Oct. 29, 1940
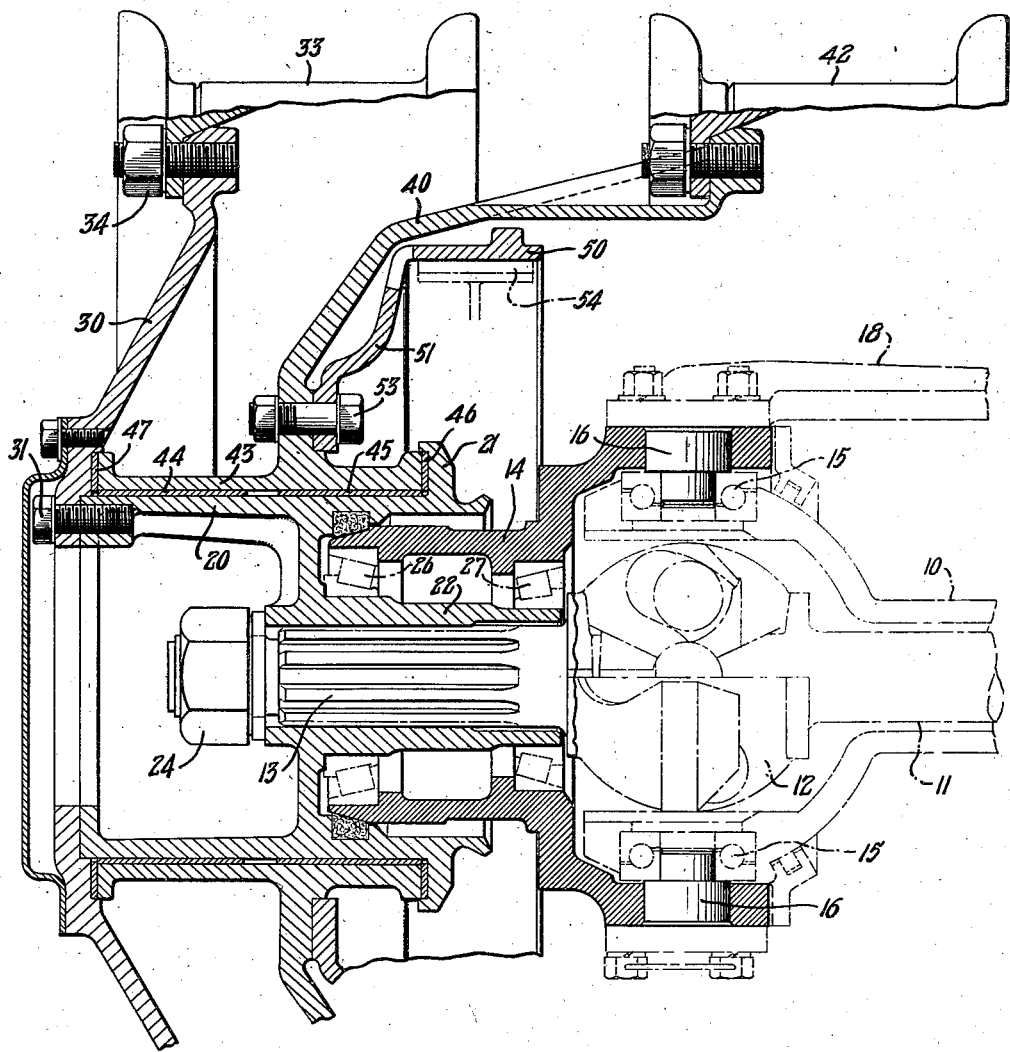

Patented Feb. 15, 1944

2,341,755

UNITED STATES PATENT OFFICE 2,341,755

DUAL WHEEL ASSEMBLY

Charles S. Ash, Milford, Mich.

Application October 29, 1940, Serial No. 363,302

7 Claims. (Cl. 180—22)

The present invention relates to a new and improved dual wheel assembly and more particularly to new and useful improvements in connection with dirigible dual wheel vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

The single figure of the drawing shows a typical and illustrative embodiment of the present invention, as applied to a conventional type of steering, driven axle, and this figure is a fragmentary vertical sectional view, with certain conventional parts being shown in dotted lines.

The present invention has for its object the provision of a novel and improved dual wheel assembly particularly adapted for use as dirigible wheels. A further object of the invention is the provision of an improved dirigible dual wheel mechanism permitting a greater degree of turning than has heretofore been possible, as well as an improved bearing construction for such wheels. The invention also provides a simple, relatively inexpensive and reliable form of dirigible dual wheels which can be used to replace the conventional dirigible wheels now used with driven front axles.

In accordance with the illustrative embodiment of the invention, there is provided a pair of side by side coaxial dual wheels having their hubs telescopically mounted with respect to each other, and capable of independent rotation. The inner hub is preferably provided with an inwardly extending portion which is internally splined for connection to the driven spindle of the axle, and is externally formed to be mounted on the axle end by means of anti-friction bearings which are received within a bearing mounting member. This bearing mounting member is pivotally supported at the end of the axle beam about a substantially vertical king pin or other pivot which coincides with the central portion of the universal connecting the driving spindle with the driving axle. The wheels are preferably formed so that the king pin lies substantially in the plane of the inner wheel, and between the point of contact of the two tires with the road. Where only one of the wheels is driven, the brake is preferably applied to the other wheel, and for this purpose the brake drum is preferably attached to the inner wheel and may cooperate with conventional brake shoes or the like.

It will be understood that the foregoing general description and the following detailed description as well are exemplary and explanatory of the invention but are not restrictive thereof.

Referring now in detail to the accompanying drawing which shows an illustrative embodiment of the invention as applied to a conventional driven dirigible axle comprising the axle housing 10, axle drive shaft 11, universal joint 12, spline spindle 13, bearing supporting cup or tube 14 mounted for pivotal movement in steering about a substantially vertical axis by means of the anti-friction bearings 15, and the king pins 16. A steering arm 18 is connected to the tubular part 14 to be turned by the pitman or other steering mechanism.

The dual wheel assembly of the present invention comprises a tubular hub portion 20 which is exteriorly cylindrical and is provided with a radial flange 21 at the inner end thereof. Extending from a central portion of this hub inwardly and coaxially therewith is a second tubular portion 22 which is internally splined to be received on and driven by the splined spindle 13, and is secured thereto by means of the retaining nut 24. The exterior portion of the tube 22 is formed to receive the tapered roller bearing 26 and 27 by which the wheel assembly is rotatably supported within the bearing supporting member 14.

At the outer face of the hub 20 is fitted the wheel member 30 of the outer wheel which is secured thereto by means of the cap screws 31. Wheel 30 may be formed of cast or stamped metal and is preferably slightly dished radially outwardly of the wheel, the peripheral edge of the wheel member 30 being formed to receive the tire mounting rim 33 which may be secured to the wheel in any desired manner as by the lug bolts 34.

The inner wheel 40 comprises a deeply dished member having the inner tire mounting rim 42 similarly attached to its periphery and overlying the king pins 16, and provided with a tubular hub-like portion 43 which is interiorly cylindrical and is mounted in the telescopic relation to the hub 20 and is mounted for independent rotation thereon by means of the bushings 44 and 45. Thrust bearings are provided between the hub 43 and the outer wheel hub 20 and comprise the thrust washers 46 and 47 positioned between the ends of the exterior hub 43 and the flange 21 and the inner face of outer wheel 30, thereby permitting free independent rotation of the inner and outer wheels and at the same time permitting easy assembly and disassembly by removal of the cap screws 31 and the outer wheel 30.

Bearings 26 and 27 are preferably positioned substantially centrally of the wheels so that the distance of bearing 26 from rims 33 and 42 is the same as the corresponding distances for bearing 27.

A brake drum 50 integrally connected with a mounting disc 51 is preferably connected to the inner wheel 40 by means of the bolts 53, and is received within the deeply dished portion of the wheel 40. Any suitable braking means may be provided to cooperate with the brake drum 50, such as the brake shoes 54.

In the operation of the illustrative embodiment, power is applied to drive the outer wheel in all steering positions of the axle from the axle shaft 11 through universal joint 12 to the spindle 13, which drives the hub 20 and wheel 30 through the cap screws 31. In the normal travel of the vehicle, the inner wheel 40 rotates freely at approximately the same speed as the outer wheel 30, giving added floatation due to the increased tire area in contact with the road, and at the same time increasing the load which may be safely applied to the front axle. When it is desired to slow or stop the vehicle the brake is applied to the drum 50 slowing or stopping the wheel 40 while the wheel 30 is free to move in accordance with the travel of the vehicle.

Steering of the vehicle is accomplished by swinging the arm 18 which causes a corresponding movement of the bearing supporting member 14 and spindle 13 about a substantially vertical axis corresponding to the axis of pins 16, and this vertical axis preferably intersects the road surface between the points of contact of the tires on rims 33 and 42, thereby facilitating the dirigible movement of the wheels. However, in order to allow this steering movement to be as great as possible, the axis of the pins 16 is preferably positioned within the plane of the inner rim 42, but close to the outer edge thereof, and this positioning of the king pins is also advantageous in that it permits the bearings 26 and 27 to be positioned more nearly equidistant than is usual from their respective tires, thereby equalizing the load upon these bearings.

Although the invention has been described particularly with reference to dirigible dual wheels, it is also applicable to non-dirigible dual wheels, and in many instances it will be possible to use the same wheel assembly for either dirigible or non-dirigible axles.

The invention in its broader aspects is not limited to the specific mechanisms shown and described but departures may be made therefrom within the scope of the accompanying claims without departing from the principles of the invention and without sacrificing its chief advantages.

What I claim is:

1. A dirigible mechanism having a pair of side by side independently rotatable wheels, including in combination a driving spindle mounted for dirigible movement, a hollow bearing supporting member mounted for movement about a substantially vertical king pin, a hub having a cylindrical outer portion and an inwardly extending portion received and supported by bearings in said supporting member and drivingly connected to the spindle, a wheel connected to the outer end of the hub, and a second wheel having its hub rotatably journalled on the cylindrical outer portion of the first hub.

2. A dirigible mechanism having a pair of side by side independently rotatable wheels, including in combination a driving spindle mounted for dirigible movement, a hollow bearing supporting member mounted for movement about a substantially vertical king pin, a hub having a cylindrical outer portion and an inwardly extending portion received and supported by bearings in said supporting member and drivingly connected to the spindle, a wheel connected to the outer end of the hub, and a second wheel having its hub rotatably journalled on the cylindrical outer portion of the first hub, said wheels extending inwardly with the king pin substantially between the sides of the inner wheel.

3. A dual wheel assembly including in combination a pair of side by side dual wheels, one of said wheels having a generally cylindrical hub on which the other wheel is rotatably journalled, said hub being formed with an inwardly extending portion internally splined to receive a driving spindle and externally formed to receive antifriction bearings.

4. A dual wheel assembly including in combination a pair of side-by-side dual wheels, a hub for the outer wheel having a cylindrical exterior, an interiorly cylindrical hub for the inner wheel journalled on the outer wheel hub in telescoping relation, said outer wheel hub having an inward extension exteriorly formed to receive anti-friction bearings and interiorly splined to receive a driving member.

5. A dirigible mechanism having a pair of side by side independently rotatable wheels including in combination a driving spindle, bearings, and a bearing support around said spindle, said spindle and bearing support being mounted for pivotal movement about a substantially vertical king pin, a pair of side by side independently rotatable wheels, one of said wheels having a hub portion on which the other wheel is rotatably journalled, said hub having an inwardly extending portion engaging the spindle and rotatably supported by said bearings.

6. A dirigible mechanism having a pair of side by side independently rotatable wheels including in combination a driving spindle, a plurality of axially spaced bearings, a bearing support around said spindle and enclosing said bearings and spindle, said spindle and bearing support being mounted for pivotal movement about a substantially vertical king pin, a pair of side by side independently rotatable wheels one of which is drivingly connected to the spindle by a tubular portion within the bearing support and rotatably mounted by the spaced bearings and the other of which is positioned at the inner side of the first wheel and rotatably mounted thereon.

7. A dirigible mechanism having a pair of side by side independently rotatable wheels including in combination a driving spindle, a plurality of axially spaced bearings, a bearing support around said spindle and enclosing said bearings and spindle, said spindle and bearing support being mounted for pivotal movement about a substantially vertical king pin, said king pin being between the points of contact of the dual wheels with the road, a pair of side by side independently rotatable wheels one of which is drivingly connected to the spindle by a tubular portion within the bearing support and rotatably mounted by the spaced bearings and the other of which is positioned at the inner side of the first wheel and rotatably mounted thereon.

CHARLES S. ASH.